Oct. 9, 1934.       H. D. GEYER       1,975,895
SEALED DOUBLE PANE GLASS AND FRAME
Filed June 19, 1933

INVENTOR
Harvey D. Geyer
BY
Spencer Hardman & Fehr
HIS ATTORNEYS

Patented Oct. 9, 1934

1,975,895

UNITED STATES PATENT OFFICE 1,975,895

SEALED DOUBLE-PANE GLASS AND FRAME

Harvey D. Geyer, Dayton, Ohio, assignor, by mesne assignments, to General Motors Corporation, Detroit, Mich., a corporation of Delaware Application June 19, 1933, Serial No. 676,509

7 Claims. (Cl. 20—56.5)

This invention relates to a protective frame for the periphery of glass panes for windows or the like, and more particularly for sealing the edges of spaced double panes of glass.

An object of this invention is to provide a simple and efficient protective frame for two spaced panes of glass and which will substantially seal the air space between the two panes in a simple and effective manner.

Another object is to simplify and lessen the cost of manufacturing such frames and of properly installing the glass panes in such frames.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 2:
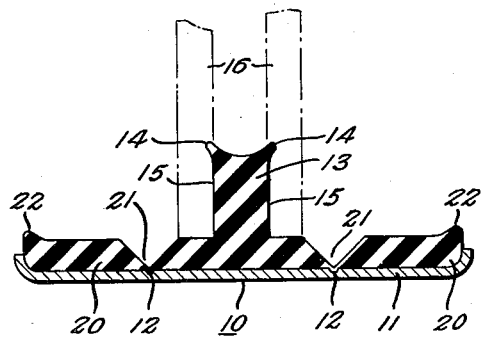
Fig. 2 is a section on line 2—2 of Fig. 1.

The flexible rubber strip 10 is first molded in long suitable lengths to the cross section clearly shown in Fig. 2 and is bonded preferably by vulcanization, but otherwise if desired, to the backing strip 11 of metal, preferably brass or other sheet metal capable of easy bending. Preferably the backing strip 11, before the rubber 10 is vulcanized thereto, is scored its full length to form the small grooves 12 therein to facilitate its subsequent bending into substantial channel section and the accurate location of the bends therein.

Figure 1:
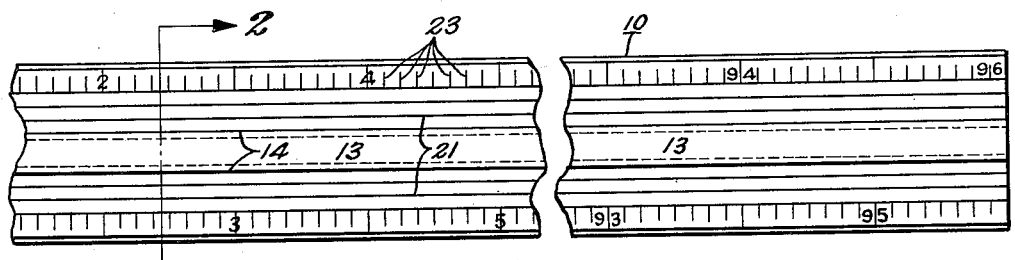
Fig. 1 is a plan view of a sealing strip made according to this invention, prior to its deformation into its final glass-enclosing form.

The rubber strip 10 is molded with a central tongue 13, which preferably has opposed outwardly flared resilient lips 14 thereon which as molded project over the straight sides 15 of tongue 13, against which the panes of glass are adapted to abut as shown by the dot-dash lines 16 in Fig. 2. The two opposed laterally extending flanges 20 of the rubber strip 10 have continuous V-shaped grooves 21 molded therein aligned with the grooves 12 in the backing strip 11 so that when the strip is deformed into channel section there will be no excess rubber at the bends to be displaced. Preferably the upwardly flared flexible lips 22, similar to the lips 14, are also provided the full length of the strip so that in the final assembly the extreme edges of the rubber will be pressed very closely upon the glass panes as shown at 22 in Fig. 6. As a matter of convenience in cutting off desired lengths of the molded sealing strip and in locating the places where the strip is to be bent to form corners therein, the small inch marks 23 may be molded in the rubber strip 10 in one or both of the flanges 20 (see Fig. 1).

Figure 3:
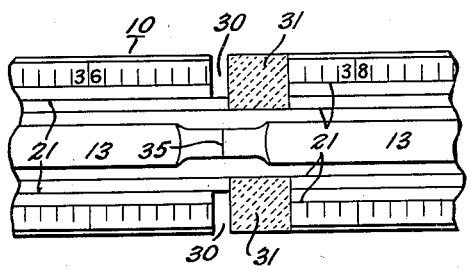
Fig. 3 is a plan view of a portion of the non-deformed strip, but shows the strip notched and the rubber portion partially cut away to facilitate the bending of the strip to make a right angle corner therein.
Figure 5:
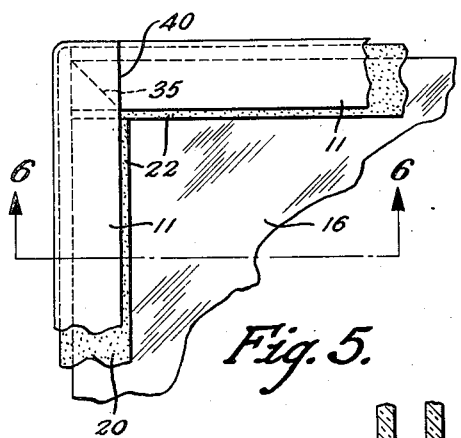
Fig. 5 is a side elevation of the corner portion of the assembled double glass and frame.
Figure 4:
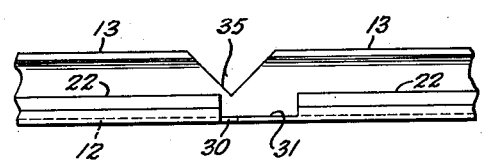
Fig. 4 is a side elevation of Fig. 3.

A length of the sealing strip is cut off sufficient to extend completely around the periphery of the glass panes 16 to be framed therein. At the locations where the corners will come the open lateral notches 30 are cut through both the rubber and the metal backing 11 (see Figs. 3 and 4), the depth of notches 30 preferably extending flush with the center line of the V-grooves 21. On one side of both notches 30 the rubber is entirely removed from the backing strip 11 over the shaded areas 31 shown in Fig. 3, since this small area 31 of the backing strip will overlap a corresponding area of the backing strip on the opposite side of the notch 30 when a right angle corner is bent in the strip and both sides of the corner bent to channel section, as shown in Fig. 5. Also the central tongue 13 has a V-shaped notch 35 cut therein to remove excess rubber for the proper bending of tongue 13 at each corner, as will be clear from the drawing.

Figure 6:
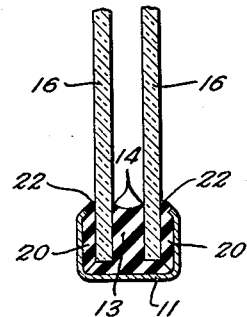
Fig. 6 is a section on line 6—6 of Fig. 5 and shows the sealing strip in its final form.

One method of assembling the strip to the glass is as follows: Insert one edge of each glass pane 16 in place against the tongue 13 and then firmly bend that portion of the sealing strip into channel section to snugly engage the glass as shown in Fig. 6; then bend the strip around the next adjacent corner of the glass panes 16 and similarly deform that side into channel section to engage the glass, the area 31 of the metal strip overlapping the already formed channel on the adjacent side as shown in Fig. 5; proceed thus until the last side is bent to channel form; then the overlapping ends of the metal backing 11 at all corners are firmly soldered together at 40 to provide a rigid frame.

If desired the strip may have the corners bent therein to form a frame prior to being bent into channel section. The frame thus formed may have the two glass panes 16 inserted laterally therein, after which the sides of the frame may be successively bent to channel section to tightly enclose the panes 16 and then the corners soldered as described above.

This invention is intended for use as a heat-insulating window and may be used in automotive vehicles, railway cars, or buildings. An important advantage thereof is that it will practically eliminate the interior fogging of windows in cold weather caused by condensation of water thereon. This is especially objectionable and dangerous in automobile windows and hence this invention has particular application to automobile windows and windshields.

While the form of embodiment of the present invention as herein disclosed, constitutes a preferred form, it is to be understood that other forms might be adopted, all coming within the scope of the claims which follow.

What is claimed is as follows:

1. A sealing strip for a double pane glass, comprising: a molded resilient rubber strip having a central compressible tongue adapted to lie between the two glass panes, and a laterally extending flange portion on each side of said central tongue and adapted to be bent upwardly after the two glass panes are assembled thereupon so as to snugly engage the two outside edges respectively of the two glass panes.

2. A sealing strip for a double pane glass comprising: a molded resilient rubber strip having a central compressible tongue adapted to lie between the two glass panes, and a laterally extending flange portion on each side of said central tongue and adapted to be bent upwardly after the two glass panes are assembled thereupon so as to snugly engage the two outside edges respectively of the two glass panes, said molded rubber strip having a deformable metal backing bonded thereto and adapted to be deformed into channel section to compress said lateral flange portions of the rubber strip upon the assembled glass panes.

3. A sealing strip for a double pane glass, comprising: a molded resilient rubber strip having a central compressible tongue adapted to lie between the two glass panes, and a laterally extending flange portion on each side of said central tongue and adapted to be bent upwardly after the two glass panes are assembled thereupon so as to snugly engage the two outside edges respectively of the two glass panes, said molded rubber strip having a deformable metal backing vulcanized directly thereto and adapted to be deformed into approximately channel section to retain said rubber lateral flange portions against the outer surfaces of the assembled glass panes.

4. A sealing strip for the periphery of a double pane glass, comprising: a molded resilient rubber strip having a central projecting tongue and laterally extending flanges on each side thereof, and a readily deformable metal backing bonded to said rubber strip and adapted to be deformed into substantial channel section after the two glass panes are put in place thereupon and thereby deform said soft rubber strip into a double grooved strip.

5. A sealing strip for the periphery of a double pane glass, comprising: a molded resilient rubber strip having a central projecting tongue and laterally extending flanges on each side thereof, and a deformable metal backing bonded to said rubber strip and adapted to be deformed into substantial channel section after the two glass panes are put in place thereupon and thereby deform said soft rubber strip into a double grooved strip, said central tongue having molded outwardly flared flexible lips thereon molded to such shape as to normally overlie the edges of the grooves formed in said strip when it is deformed.

6. A sealing strip for the periphery of a double pane glass, comprising: a molded resilient rubber strip having a central projecting tongue and laterally extending flanges on each side thereof, and a deformable metal backing bonded to said rubber strip and adapted to be deformed into substantial channel section after the two glass panes are put in place thereupon and thereby deform said soft rubber strip into a double grooved strip, said lateral flanges having molded flexible lips thereon molded to such shape as to normally overlie the edges of the grooves formed in said strip when it is deformed.

7. A sealing strip for a glass pane, comprising: a molded resilient rubber strip having two lateral flanges adapted to be folded toward each other to snugly engage an inserted glass pane, and a deformable metal backing vulcanized in situ to said rubber strip and having bending grooves therein so as to be readily deformed into substantial channel section and thereby deform and retain said rubber strip into tight engagement with an inserted glass pane.

HARVEY D. GEYER.